(12) United States Patent
Elteto et al.

(10) Patent No.: US 7,269,844 B2
(45) Date of Patent: Sep. 11, 2007

(54) SECURE IR COMMUNICATION BETWEEN A KEYPAD AND A TOKEN

(75) Inventors: Laszlo Elteto, Irvine, CA (US); Shawn D. Abbott, Calgary (CA); James Khalaf, Santa Ana (CA); Reed H. Tibbetts, Tustin, CA (US); Mehdi Sotoodeh, Mission Viejo, CA (US); Calvin W. Long, Arcadia, CA (US)

(73) Assignee: SafeNet, Inc., Belcamp, MD (US)

( * ) Notice: Subject to any disclaimer, the term of this patent is extended or adjusted under 35 U.S.C. 154(b) by 304 days.

(21) Appl. No.: 09/899,472

(22) Filed: Jul. 3, 2001

(65) Prior Publication Data

US 2002/0046342 A1 Apr. 18, 2002

Related U.S. Application Data

(63) Continuation-in-part of application No. 09/764,769, filed on Jan. 16, 2001, and a continuation-in-part of application No. 09/594,456, filed on Jun. 15, 2000, and a continuation-in-part of application No. 09/449,159, filed on Nov. 24, 1999, and a continuation-in-part of application No. 09/281,017, filed on Mar. 30, 1999, now Pat. No. 6,671,808.

(60) Provisional application No. 60/116,006, filed on Jan. 15, 1999.

(51) Int. Cl.
*G06F 17/30* (2006.01)
*H04B 1/00* (2006.01)
*H04Q 1/00* (2006.01)

(52) U.S. Cl. ............... 726/2; 726/9; 726/20; 726/26; 380/201; 380/202; 380/203; 713/156; 713/159; 713/172; 713/173; 713/182; 713/185; 340/5.6; 340/5.61; 340/5.64

(58) Field of Classification Search ........ 713/172–173, 713/182–185, 200–202, 156, 159; 709/223–229; 380/200–203; 726/2, 9, 20, 26; 340/5.6, 340/5.61, 5.14
See application file for complete search history.

(56) References Cited

U.S. PATENT DOCUMENTS 4,799,258 A 1/1989 Davies
(Continued)

FOREIGN PATENT DOCUMENTS

EP 0 791 877 A1 8/1997
(Continued)

OTHER PUBLICATIONS

Aladdin, http://www.aks.com, 1999.*
(Continued)

*Primary Examiner*—Ayaz Sheikh
*Assistant Examiner*—Jenise E. Jackson
(74) *Attorney, Agent, or Firm*—Drinker Biddle & Reath LLP

(57) ABSTRACT

A device that secures a token from unauthorized use is disclosed. The device comprises a user interface for accepting a personal identifier, a processor, communicatively coupled to the user interface device, and a token interface. The token interface includes a token interface IR emitter that produces an IR signal having information included in the PIN. The token IR emitter is coupled to the processor and is further communicatively coupled to a token IR sensor when the token is physically coupled with the token interface. The token interface also includes a shield, substantially opaque to the IR signal, for substantially confining the reception of the IR signal to the token IR sensor. In one embodiment, the shield substantially circumscribes the IR emitter. In another embodiment, the interface also comprises a token interface IR sensor, which allows communications from the token to the device as well.

15 Claims, 12 Drawing Sheets

U.S. PATENT DOCUMENTS

| | | | |
|---|---|---|---|
| 5,857,024 A | | 1/1999 | Nishino et al. |
| 5,937,068 A | * | 8/1999 | Audebert .................... 713/185 |
| 6,425,084 B1 | * | 7/2002 | Rallis et al. ................ 713/185 |
| 6,516,357 B1 | * | 2/2003 | Hamann et al. ............... 710/2 |

FOREIGN PATENT DOCUMENTS

| | | |
|---|---|---|
| EP | 1 001 329 A2 | 5/2000 |
| GB | 2 154 344 A | 9/1985 |
| WO | WO 00/23936 A1 | 4/2000 |
| WO | WO 00/75755 A1 | 12/2000 |

OTHER PUBLICATIONS

Microcomputer Application Inc., http://www.keylok.com, 2000.*

WIBU-Systems AG, "WIBU-KEY User's Guide Version 2.50," Jul. 1998, XP002139265, Internet: URL:ftp://www2.wibu.de/pub/download/us/UG250US.pdf, pp. 12-14, 163-164.

Rainbow Technologies, News Release, "Rainbow Technologies Adds USB Support For PC And Macintosh Software Developes to Sentinel Line," Nov. 17, 1998, XP002139273, Internet: http://www.rainbow.com/invest/PR981117b.html (2 pages).

Cylink PrivateSafe: Products & Solutions, Smart Card Reader Protects User As Unsecurable Standard PC's, © 2000, http://www.cylink,com/products/smartolls/safe/safe.htm, pp. 103.

Cylink PrivateSafe, datasheet, "A Smart Card Reader That Protects Passwords, PIN's and Private Keys," © 2000 Cylink Corporation, 2pp.

* cited by examiner

SECURE IR COMMUNICATION BETWEEN A KEYPAD AND A TOKEN

CROSS-REFERECNCE TO RELATED APPLICATIONS

This application is also continuation-in-part of the following co-pending and commonly assigned patent applications, each of which applications are hereby incorporated by reference herein:

U.S. patent application Ser. No. 09/449,159, filed Nov. 24, 1999, by Shawn D. Abbott, Bahram Afghani, Mehdi Sotoodeh, Norman L. Denton III, and Calvin W. Long, and entitled "USB-COMPLIANT PERSONAL KEY WITH INTERGRAL INPUT AND OUTPUT DEVICES";

U.S. patent application Ser. No. 09/281,017, filed Mar. 30, 1999, now U.S. Pat. No. 6,671,808 by Shawn D. Abbott, Bahram Afghani, Allan D. Anderson, Patrick N. Godding, Maarten G. Punt, And Mehdi Sotoodeh, and etitled "USB-COMPLIANT PERSONAL KEY," which claims benefit of U.S. Provisional Patent Application No. 60/116,006, filed Jan. 15, 1999 by Shawn D. Abbott, Barham Afghani, Allan D. Anderson, Patrick N. Godding, Maarten G. Punt and Mehdi Sotodeh, and entitled "USB-COMPLIANT PERSONAL KEY";

U.S. patent application Ser. No. 09/594,456, filed Jun. 15, 2000, by Shawn D. Abbott, Allan D. Anderson, Patrick N. Godding, Maareten G. Punt, and Medhi Sotoodeh, and entitled "USB-COMPLIANT PERSONAL KEY USING A SMARTCARD PROCESSOR AND A SMARTCARD READER EMULATOR"; and U.S. patent application Ser. No. 09/764,769, filed Feb. 16, 2001, by Laszlo Elteto, Shawn D. Abbott, Jim Khalaf, Reed H. Tibbetts, Medhi Sotoodeh, and Calvin W. Long, and entitled "USB HUB KEYPAD".

BACKGROUND OF THE INVENTION

1. Field of the Invention

The present invention relates to computer peripherals, and in particular to a keypad permitting the secure entry and transfer of user data to a portable token.

2. Description of the Related Art

In the last decade, the use of personal computers in both the home and in the office have become widespread. These computers provide a high level of functionality to many people at a moderate price, substantially surpassing the performance of the large mainframe computers of only a few decades ago. The trend is further evidenced by the increasing popularity of laptop and notebook computers, which provide high-performance computing power on a mobile basis.

The widespread availability of personal computers has had a profound impact on interpersonal communications as well. Only a decade ago, telephones or fax machines offered virtually the only media for rapid business communications. Today, a growing number of businesses and individuals communicate via electronic mail (e-mail). Personal computers have also been instrumental in the emergence of the Internet and its growing use as a medium of commerce.

While certainly beneficial, the growing use of computers in personal communications, commerce, and business has also given rise to a number of unique challenges.

First, the growing use of computers has resulted in extensive unauthorized use and copying of computer software, costing software developers substantial revenue. Although unauthorized copying or use of software is a violation of the law, the widespread availability of pirated software and enforcement difficulties have limited the effectiveness of this means of preventing software piracy.

While it reflects a tremendous advance over telephones and facsimile machines, e-mail also has its problems. One of these problems involves security. Telephone lines are relatively secure and a legally sanctioned way to engage in the private transmission of information, however, e-mails are generally sent over the Internet with no security whatsoever. Persons transmitting electronic messages must be assured that their messages are not opened or disclosed to unauthorized persons. Further, the addressee of the electronic message should be certain of the identity of the sender and that the message was not tampered with at some point during transmission.

Although the packet-switching nature of Internet communications helps to minimize the risk of intercepted communications, it would not be difficult for a determined interloper to obtain access to an unprotected e-mail message.

Many methods have been developed to secure the integrity of electronic messages during transmission. Simple encryption is the most common method of securing data. Both secret key encryption such as DES (Data Encryption Standard) and public key encryption methods that use both a public and a private key are implemented. Public and private key encryption methods allow users to send Internet and e-mail messages without concern that the message will be read by unauthorized persons or that its contents will be tampered with. However, key cryptographic methods do not protect the receiver of the message, because they do not allow the recipient to authenticate the validity of the public key or to validate the identity of the sender of the electronic message.

The use of digital certificates presents one solution to this problem. A digital certificate is a signed document attesting to the identity and public key of the person signing the message. Digital certificates allow the recipient to validate the authenticity of a public key. However, the typical user may use e-mail to communicate with hundreds of persons, and may use any one of several computers to do so. Hence, a means for managing a number of digital certificates across several computer platforms is needed.

Internet commerce raises other challenges. Users seeking to purchase goods or services using the Internet must be assured that their credit card numbers and the like are safe from compromise. At the same time, vendors must be assured that services and goods are delivered only to those who have paid for them. In many cases, these goals are accomplished with the use of passwords. However, as Internet commerce becomes more commonplace, customers are finding themselves in a position where they must either decide to use a small number of passwords for all transactions, or face the daunting task of remembering multiple passwords. Using a small number of passwords for all transactions inherently compromises security, since the disclosure of any of the passwords may lead to a disclosure of the others. Even the use of a large number of passwords can lead to compromised security. Because customers commonly forget their password, many Internet vendors provide an option whereby the user can be reminded of their password by providing other personal information such as their birthplace, mother's maiden name, and/or social security number. This feature, while often necessary to promote Internet commerce, severely compromises the password by relying on "secret" information that is in fact, publicly available.

Even in cases where the user is willing and able to keep track of a large number of passwords, the password security technique is often compromised by the fact that the user is inclined to select a password that is relatively easy to remember. It is indeed rare that a user selects a truly random password. What is needed is a means for generating and managing random passwords that can be stored and recalled for use on a wide variety of computer platforms.

Internet communications have also seen the increased use of "cookies." Cookies comprise data and programs that keep track of a user's patterns and preferences that can be downloaded from the Internet server for storage on the user's computer. Typically, cookies contain a range of addresses. When the browser encounters those addresses again, the cookies associated with the addresses are provided to the Internet server. For example, if a user's password were stored as a cookie, the use of the cookie would allow the user to request services or goods without requiring that the user enter the password again when accessing that service for the second and subsequent time.

However beneficial, cookies can also have their dark side. Many users object to storage of cookies on their computer's hard drive. In response to these concerns, Internet browser software allows the user to select an option so that they are notified before cookies are stored or used. The trouble with this solution is that this usually results in an excessive number of messages prompting the user to accept cookies. A better solution than this all-or-nothing approach would be to allow the storage and/or use of cookies, but to isolate and control that storage and use to comply with user-specified criteria.

Personal keys, such as those that are described in the co-pending and commonly assigned patent applications referenced herein can provide some of the above mentioned functionality. Such personal keys offer a single repository for a great deal of sensitive information, thus freeing the user from the concern of managing passwords and other sensitive information. They also permit the user to store data files with important information in a portable, widely-accepted format. However, the user's personal key may be lost or stolen, possibly exposing the owner to the compromise of a great deal of sensitive information. One way to reduce this risk is to require the user to input a personal identification number (PIN) into the personal key before use (or, between a particularly sensitive use). At the same time, the entry of the PIN into the key must be secure, or the user's PIN (and hence, the data stored therein) may be compromised. Sniffer modules for example, may monitor the personal key interface to external devices, thus exposing the user's PIN to compromise. As described in the co-pending and commonly assigned patent applications referenced herein, one way to prevent this compromise is to include a PIN input device in the personal key itself. However, this solution can increase the cost and the size of the personal key.

From the foregoing, it can be seen that there is a need for an inexpensive system and method that allows the user to securely enter personal or sensitive information into a personal key (such as the user's PIN) while minimizing the risk that the information will be compromised in the transmission. The present invention satisfies that need.

SUMMARY OF THE INVENTION

The present invention satisfies all of these needs with a device for securing a personal key or token from unauthorized use. The device comprises a user interface for accepting a personal identifier such as a personal identification number (PIN), a processor, communicatively coupled to the user interface device, and a token interface. The token interface includes a token interface infra red (IR) emitter that produces an IR signal having information included in the PIN. The token IR emitter is coupled to the processor and is further communicatively coupled to a token IR sensor when the token is physically coupled with the token interface. The token interface also includes a shield, substantially opaque to the IR signal, for substantially confining the reception of the IR signal to the token IR sensor. In one embodiment, the shield substantially circumscribes the IR emitter. In another embodiment, the interface also comprises a token interface IR sensor, which allows communications from the token to the device as well.

The present invention is also described as a method for securing a token having a USB-compliant interface from unauthorized use. The method comprises the steps of accepting the token in a device having a token interface including a USB-compliant port, accepting a user entered PIN, and transmitting the user-entered PIN to the token via a communication path independent from the USB-compliant interface. In disclosed embodiments, the PIN is transmitted to the token only when the token is determined to be accepted by the device. In one embodiment, this is accomplished by determining the proximity of sensors on the device and the token.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
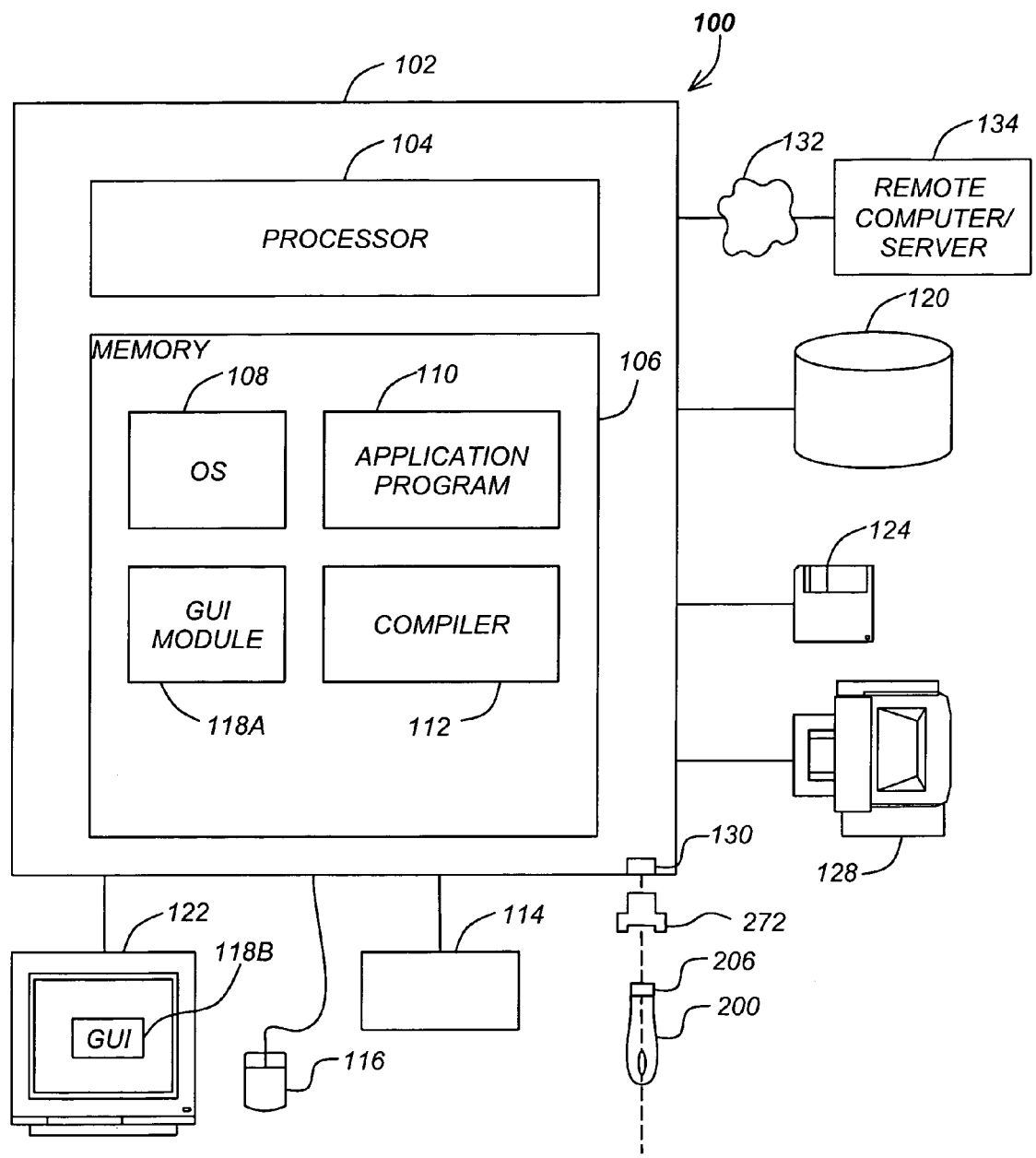
FIG. 1 is a diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that are generated using the compiler 112. The computer 102 also comprises an input/output (I/O) port 130 for a personal token 200 (hereinafter alternatively referred to also as a personal key 200). In one embodiment, the I/O port 130 is a USB-compliant port implementing a USB-compliant interface.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

The computer 102 may be communicatively coupled to a remote computer or server 134 via communication medium 132 such as a dial-up network, a wide area network (WAN), local area network (LAN), virtual private network (VPN) or the Internet. Program instructions for computer operation, including additional or alternative application programs can be loaded from the remote computer/server 134. In one embodiment, the computer 102 implements an Internet browser, allowing the user to access the world wide web (WWW) and other internet resources.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Architectural Overview

Figure 2:
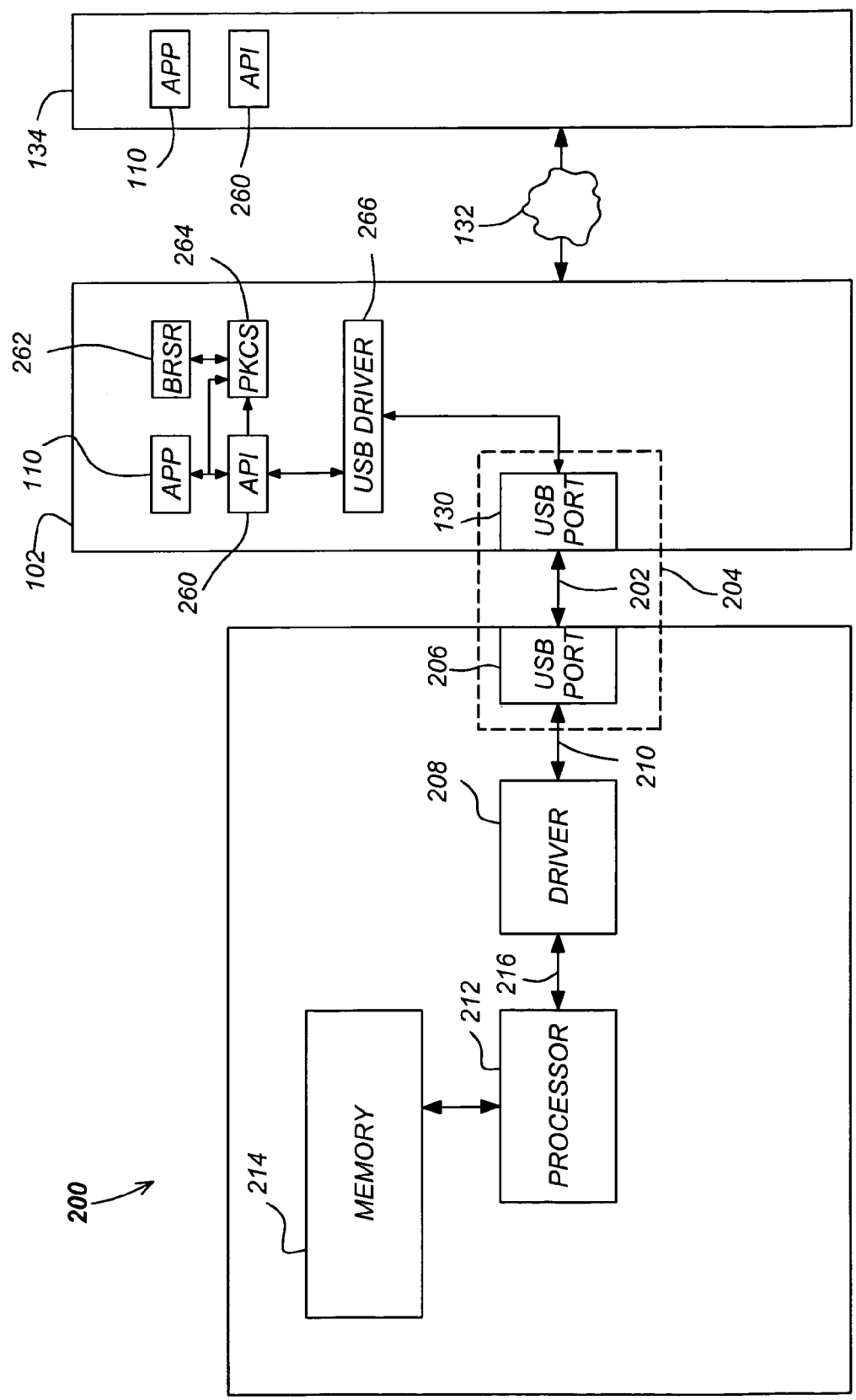
FIG. 2 is a block diagram illustrating selected modules of one embodiment of the present invention.

FIG. 2 is a block diagram illustrating selected modules of the present invention. The personal key 200 communicates with and obtains power from the host computer through a USB-compliant communication path 202 in the USB-compliant interface 204 which includes the input/output port 130 of the host computer 102 and a matching input/output (I/O) port 206 on the personal key 200. Signals received at the personal key I/O port 206 are passed to and from the processor 212 by a driver/buffer 208 via communication paths 210 and 216. The driver/buffer 208 may be a hardware device separate from the processor 212, or may be a module within the processor itself. The processor 212 is communicatively coupled to a memory 214, which may store data and instructions to implement the above-described features of the invention. In one embodiment, the memory 214 is a non-volatile random-access memory that can retain factory-supplied data as well as customer-supplied application related data. The processor 212 may also include some internal memory for performing some of these functions.

The personal key has an interface including a USB driver module 266 communicatively coupled to an application program interface (API) 260 having a plurality of API library routines. The API 260 provides an interface with the application 110 to issue commands and accept results from the personal key 200. In one embodiment, a browser 262, such as the browser available from NETSCAPE, Inc. operates with the API 260 and the public key cryptographic standard (PKCS) module 264 to implement a token-based user authentication system.

Figure 3:
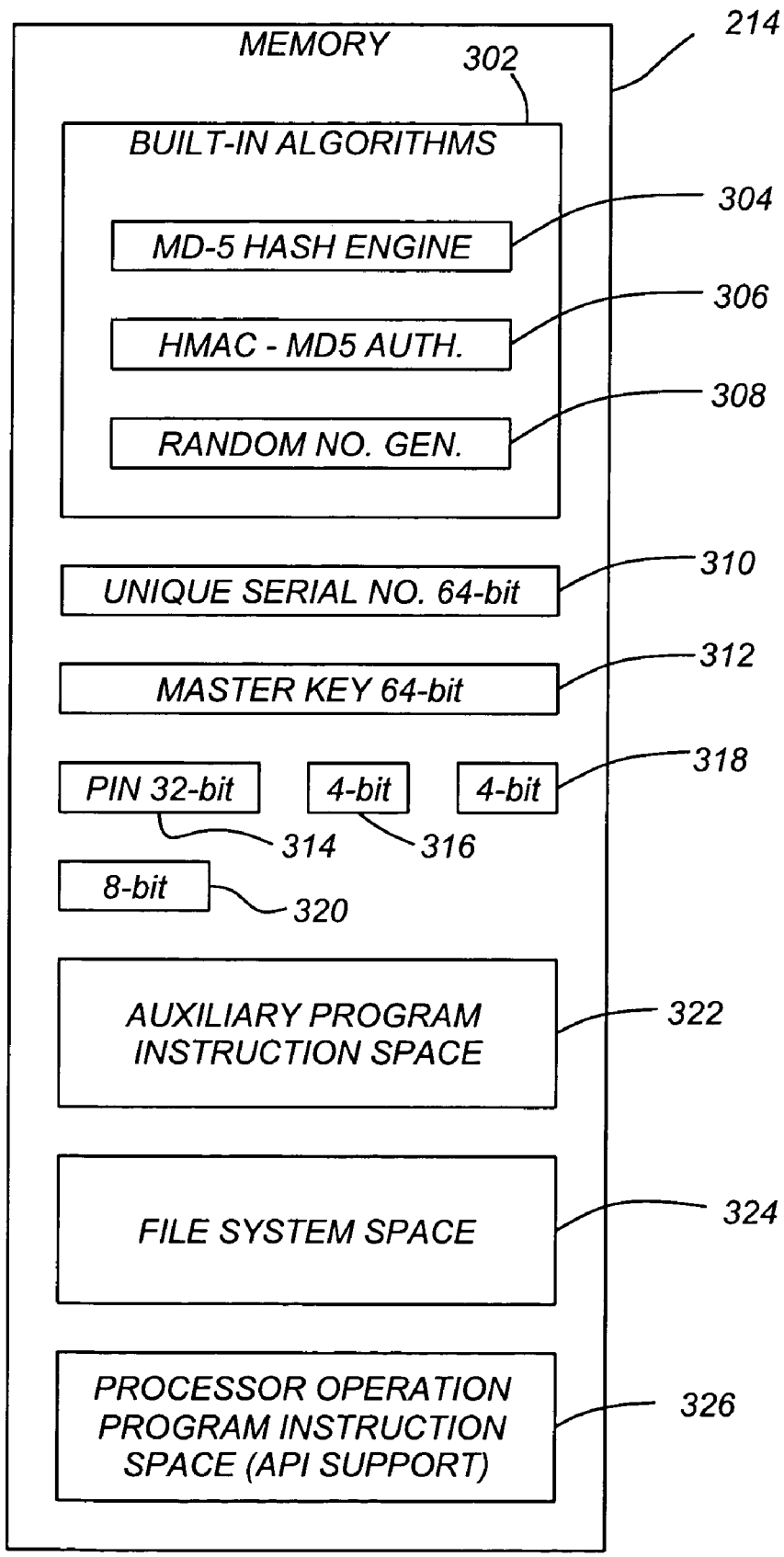
FIG. 3 is a diagram of the memory resources provided by the memory of the personal key.

FIG. 3 is a diagram of the memory resources provided by the memory 214 of the personal key 200. The memory resources include a master key memory resource 312, a personal identification number (PIN) memory resource 314, an associated PIN counter register 316 and PIN reset register resource 318, a serial number memory resource 310, a global access control register memory resource 320, a file system space 324, auxiliary program instruction space 322, and a processor operation program instruction space 326. The processor operation program instruction space 326 stores instructions that the personal key 200 executes to perform the nominal operations described herein, including those supporting functions called by the application program interface 260 associated with the applications 110 executing in either the host computer 102 or the remote server 134. The auxiliary program instruction space provides the personal key 200 with space to store processor 212 instructions for implementing additional functionality, if desired.

The master key is an administrative password that must be known by the trusted entity or program that will initialize and configure the personal key 200. For example, if the personal key 200 is to be supplied to a number of remotely located employees to enable access to private documents stored in a remote server through a VPN, the system administrator for the remote server may enter the master key (or change the key from the factory settings) before providing the key to the remotely located employees. The system administrator also stores the master key in a secure place, and uses this master key to perform the required secure operations (including, for example, authorization and authentication of the remote users).

In one embodiment, the master key can not be configured, reset, or initialized if the MKEY can not be verified first. Hence, if the master key is unknown the personal key 200 would have to be destroyed/thrown away or returned to the factory to be reset to the factory settings.

The PIN is an optional value that can be used to authenticate the user of the personal key 200. The PIN is initialized by the trusted administrator. Depending on how the personal key 200 initialization program is implemented and deployed, it is possible for the end user to set and/or update their PIN. The PIN may comprise alphanumeric characters or simply numbers.

The PIN can also be checked using an application program interface (API) call that transparently uses the two associated registers 316 and 318. The PIN counter resource 316 is a decrementing counter, while the PIN reset register resource 318 is used to store a limit that is used to reset the PIN counter 316 memory resource. The PIN count and limit registers 316 and 318 are used to prevent a rogue application or user from rapidly testing thousands of random PINs in an attempt to discover the PIN.

When the PIN is initialized, the decrementing counter register 316 is set to the value in the PIN reset register resource 318. Whenever a PIN verification fails the counter register 316 is decremented. When a PIN verification succeeds then the counter register is set to the limit value. When the decrementing counter register 316 reaches 0, no more PIN verifications are permitted until a trusted administrator resets the PIN counter register 316 to the limit value. For example if the PIN reset register resource 318 limit has been set to 3, then a user could fail PIN verification 3 times whereupon the PIN would be rendered useless until it is reset. The counter register 316 would be reset to 3 when a correct PIN was successfully verified.

The serial number is a unique factory installed serial number (SN). The serial number can be used to differentiate a single user from all other personal key 200 users.

The memory 214 of the personal key 200 also includes built in algorithm memory resources 302, including a MD5 hash engine memory 304 for storing related processing instructions, an HMAC-MD5 authorization memory resource 306 for storing related processing instructions, and a random number generator memory resource 308 for storing processing instructions for generating random numbers. The random number generator can be used to generate challenges to be used when generating authentication digest results as well as to provide seeds to other cryptographic procedures. The MD5 algorithm accepts as an input a message of arbitrary length, and produces a 128-bit "fingerprint" or "message digest" of the input as an output. In doing so, the algorithm scrambles or hashes the input data into a reproducible product using a high speed algorithm such as RFC-1321. The hashed message authentication codes (HMAC) can be used in combination with any iterated cryptographic hash function (e.g. MD5) along with a secret key, to authenticate a message or collection of data. The personal key 200 integrates this method to provide a way for the end user or application data to be authenticated without exposing the secret key.

The present invention allows end user authorization using two security mechanisms. The first mechanism, which is discussed below, allows software running on the host computer 102 or the remote computer/server 134 to authenticate the personal key 200. This first mechanism uses a hashing algorithm and a mutually agreed upon secret value known to both the personal key 200 and the entity attempting to authenticate the personal key. The second mechanism, which is discussed later in this disclosure, allows the personal key 200 to authenticate the user who is trying to use the personal key 200. This second mechanism uses a personal identification number (PIN) to help prevent unauthorized use or access in situations where the key has been lost or stolen.

Figure 4:
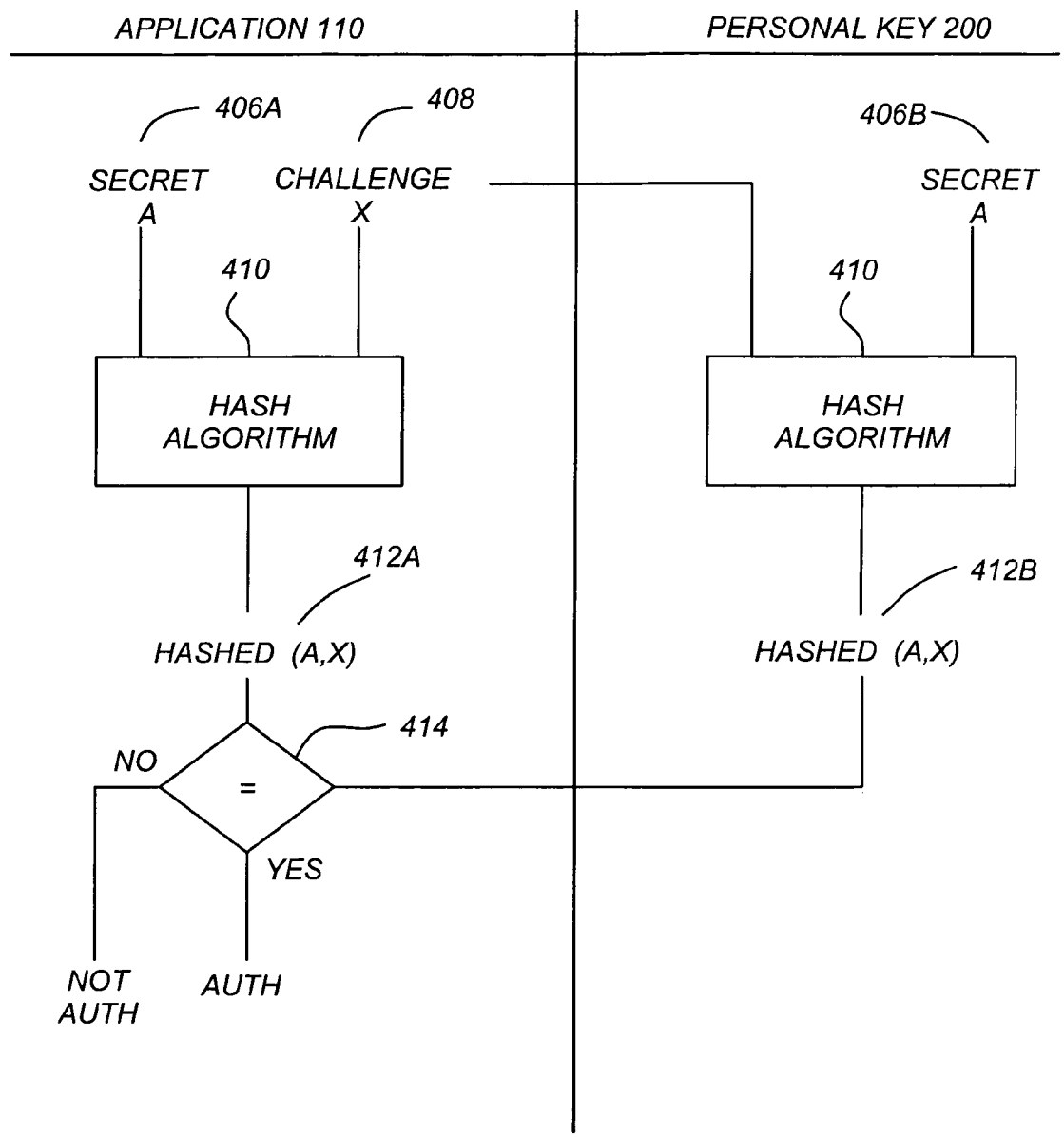
FIG. 4 is a diagram showing one embodiment of how an encryption engine is used to authenticate the identity of the personal key or the application data stored therein.

FIG. 4 is a diagram showing one embodiment of how the HMAC-MD5engine is used to authenticate the identity of the personal key 200 or the application data stored therein. Associated with the personal key 200 and executing either in the host computer 102 or the remote computer/server 134 is a personal key library of functions which are linked with an application executing in the host computer (e.g. application program 110) or in the remote computer/server 134. A hash algorithm 410 is implemented in both the application 110 and the personal key 200. Both the application 110 and the personal key 200 have access to a secret 406. The secret 406B is retained within the memory 214 of the personal key 200 in a location where it cannot be accessed without suitable permission. Typically, secret 406B is stored in the personal key 200 by the system administrator or some other trusted source. Hence, if the user of the personal key 200 is the entity that the application 110 thinks it is, the application's secret 406A and the personal key's secret 406B are the same. This can be verified by a hashing algorithm without exposing the secret. Similarly, if the user of the personal key 200 is not the entity that the application expects, secrets 406A and 406B will be different. This too can be verified by a hashing algorithm without exposing the secret.

A challenge is generated by the application 110, and provided to the hash algorithms 410 accessible to the application 110 and the hash algorithm implemented in the personal key 200. Each hash algorithm applies the challenge and the resident secret to generate a hashed output 412. If the hash algorithms were equivalent and each of the secrets 406A and 406B were the same, the resulting hashed output 412 or digest string in each case should be the same. If the digest strings 412A and 412B compare equal using logic 414 in the application, the personal key 200 is trusted. Further, if the user authentication was verified, the user is trusted as well. One advantage in this authentication system is that the challenge 408 and the response 412B can be transmitted over untrusted media such as the Internet. The secret 406 remains coded in the application 110 or remote server 134 program and in the personal key 200 where it remains without being exposed to network sniffers/snoopers or potentially compromised user interfaces.

The file system memory resource 324 is fully managed within the application program interface library 260 in either the host computer 102 or the remote server 134. It provides a flexible system for storing, protecting, and retrieving personal key 200 data.

Figure 5:
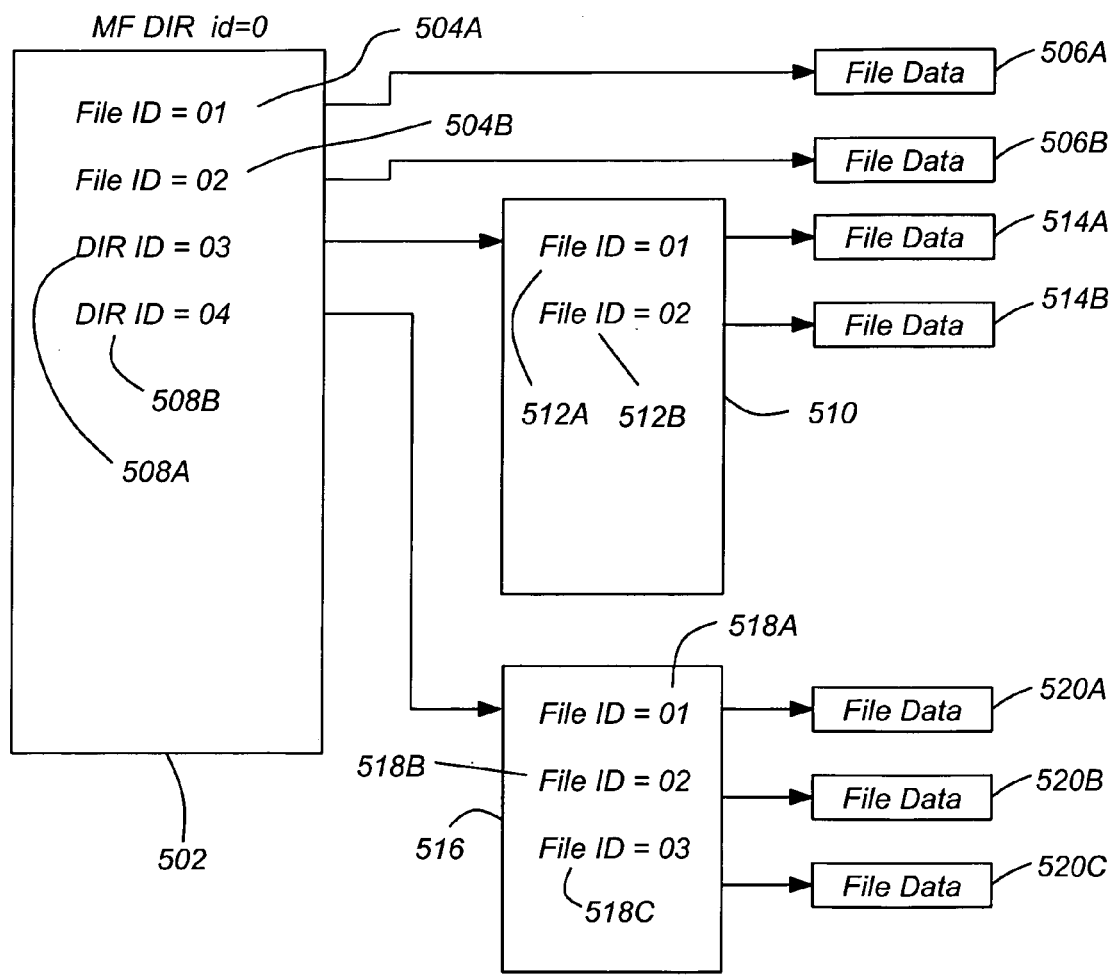
FIG. 5 is a diagram illustrating the data contents of a file system memory resource of an active personal key that provides authentication and specific configuration data for several applications.

FIG. 5 is a diagram illustrating the data contents of a file system memory resource 324 of an active personal key 200 that provides authentication and specific configuration data for several applications. The master file (MF) 502 is the root directory and uses an identifier (ID) of zero (0). The MF 502 may contain pointers 504A and 504B or other designations to data files 506A and 506B, as well as pointers 508A and 508B to directories 510 and 516. Directories and files are defined by an identifier (1→0xFFFF for the directories, and 0→0xFFFF for files). The directories 510 and 516 also contain pointers (512A-512B and 518A-518C, respectively) to data files (514A-514B and 520A-520C, respectively).

Three file types are implemented, as shown in Table 1 below:

TABLE 1

| Type | Access |
|------|--------|
| DATA | Any variable length string of unsigned characters |
| KEY | Strings that are used as input to cryptographic operations |
| CTR | Data files that have a decrementing counter (e.g. a counter of 16 bits). The counters range from 0 to 0xFFFF and are used to limit the number of times a data file can be read. |

These file types can be controlled on a per-file basis, according to Table 2 below:

TABLE 2

| | File Types | | |
|---|---|---|---|
| Access Types | DATA | KEY | CTR |
| Read | Control | Never - no control | Control |
| Write | Control | Control | Control |
| Crypt | Always - no control | Control | Always - no control |

The read and write access type controls govern the transfer of files in the personal key 200 to and from the application 110. The crypt access type is used with KEY file types for performing cryptographic operations including the computation of hash values, encrypting, or decrypting data. When set, the controls defined in Table 2 can have one of four attributes listed in Table 3 below:

TABLE 3

| Attribute | Access |
|-----------|--------|
| ALWAYS | Always granted, regardless of whether the proper PIN or MKEY has been supplied to the personal key 200. |
| NEVER | Never granted, regardless of whether the proper PIN or MKEY has been supplied to the personal key 200. |
| PIN | Access is granted if and only if the proper PIN has been supplied to the personal key 200, and PIN verification is successful (user authentication). |
| MKEY | Access is granted if and only if the proper master key (MKEY) has been provided to the personal key 200, and master key verification is successful (super user or security officer authentication). |

A global access control register 320 applies to the entire scope of the personal key 200 file system. Nominally, the global access control register 320 is an 8-bit value that is divided into two global access controls as shown in Table 4 below:

TABLE 4

| Global Access Type | Global File System Access |
|--------------------|---------------------------|
| Create | Control |
| Delete | Control |

The create and delete global access types can have one of the four attribute values shown in Table 5 below. The create and delete global controls are enforced by the CreateDir, CreateFile, DeleteDir, and DeleteFile API calls described in Table 5 below.

TABLE 5

| Attribute | Access |
|-----------|--------|
| ALWAYS | Always granted, regardless of whether the proper PIN or MKEY has been supplied to the personal key 200. |
| NEVER | Never granted, regardless of whether the proper PIN or MKEY has been supplied to the personal key 200. |
| PIN | Access is granted if and only if the proper PIN has been supplied to the personal key 200, and PIN verification is successful (user authentication). |
| MKEY | Access is granted if and only if the proper MKEY has been supplied to the personal key 200, and PIN verification is successful (super user or security officer authentication). |

Table 6 is an alphabetical listing of personal key 200 APIs 260 in the library. In Table 6, "D" indicates a device-related function, "F" denotes a file system related function, "A" denotes an administrative function, and "C" denotes a cryptographic function.

TABLE 6

| Name | Description | D | F | A | C |
|------|-------------|---|---|---|---|
| CloseDevice | Close access to the personal key | ✓ | | | |
| CloseFile | Close selected file | | ✓ | | |
| CreateDir | Create a directory in the personal key memory | | ✓ | ✓ | |
| CreateFile | Create a file in the personal key memory | | ✓ | ✓ | |
| Decrement | Decrement a CTR type file | | ✓ | | |
| DeleteAllFiles | Reformat file space | | ✓ | ✓ | |
| DeleteDir | Delete directory | | ✓ | ✓ | |
| DeleteFile | Delete file | | ✓ | ✓ | |
| Dir | Return directory and file information | | ✓ | | |
| GetAccessSettings | Return current global create/delete | | | ✓ | |
| GetChallenge | Returns a 64-bit random number | | | ✓ | ✓ |
| GetSerialNumber | Read unique serial number | ✓ | | ✓ | |
| HashToken | MD5 hash the selected file or currently open file - two modes are supported (1) XOR hash and HMAC hash | | ✓ | | ✓ |
| HMAC_MD5 | This function is a wrapper for performing HMAC-MD5 using the HashToken function in the HMAC mode. It computes MD5 without exposing the key. | | ✓ | | ✓ |
| LedControl | Control the output device, including turning an LED or other output device on or off | ✓ | | | |
| ModifyMasterKey | Update/Modify master key | | | ✓ | |
| ModifyPIN | Update/Modify PIN | | | ✓ | |
| OpenDevice | Open one of 32 potential personal keys | ✓ | | | |
| ReadFile | Return contents of selected file | | ✓ | | |
| ResetDevice | Reset to power-on state | ✓ | | ✓ | |
| SelectFile | Open a file | | ✓ | | |
| SetAccessSettings | Update global create/delete access settings | | | ✓ | |
| VerifyMasterKey | Verify the master key provided as argument is the master key stored in the personal key | | | ✓ | |
| VerifyPIN | Verify that the PIN provided as an argument is the PIN stored in the personal key (user authentication) | | | ✓ | |
| VerifyPIN2 | An alternative command used to verify the user PIN without exposing the PIN externally to the personal key 200. This command is issued without the PIN as an argument, and the | | | | ✓ |

TABLE 6-continued

| Name | Description | D | F | A | C |
|------|-------------|---|---|---|---|
| | personal key 200 returns a response indicating whether the PIN entered by the user on the PIN entry device 272 matches that of the stored PIN in the memory 314. | | | | |
| WriteFile | Write contents to the selected file | | ✓ | | |
| MD5_Hash | Hash routine: wrapper (provided in API library and not implemented in personal key) | | | | ✓ |
| MD5Final | Finish computation and return digest (provided in API library and not implemented in personal key) | | | | ✓ |
| MD5Init | Initialize message digest context (provided in API library and not implemented in personal key) | | | | ✓ |
| MD5Update | Update message digest context (provided in API library and not implemented in personal key) | | | | ✓ |

Exemplary Application to a Virtual Private Network

Using the foregoing, the personal key 200 and related APIs 260 can be used to implement a secure document access system. This secure document access system provides remote users access to secret encrypted documents over the Internet to company employees. The system also limits the circulation of secret encrypted documents so that specified documents can be read only a limited number of times.

The application program 110 used for reading documents is linked with the personal key API 260 library to allow document viewing based on the information in the personal key 200. A trusted administrative program controlled by the master key can be used to set up the personal key 200 (by storing the appropriate information with the associated security control settings) for a wide range of employees.

The personal key 200 and the API 260 library can be used to authenticate document viewers and administrators, to supply keys for decryption and encryption of documents, to provide a list of viewable documents, and to enforce document access rights and counters.

The foregoing can be implemented in a number of programs, including an administrative initialization program to set up the personal keys 200 before delivery to the employees (hereinafter referred to as SETKEY), a document encryption and library update program (hereinafter referred to as BUILDDOC), a viewer application that authenticates the user and the personal key 200 (hereinafter referred to as VIEWDOC), and a library application which authenticates the user and updates the personal key (hereinafter referred to as LIBDOC).

The SETKEY program is used to setup personal keys received from the factory for individual users. Document names, access counters, a PIN, and a hash secret are loaded into the personal key 200. Depending on the employee's security clearance, specific documents can be configured for viewing. For sake of clarification the following symbolic names are used in the discussion below:

DOCFilename-iKey data file that holds the document file name

DOCSecret-iKey data file that holds a secret used to make encryption/decryption keys First, the SETKEY program gains access to the personal key 200 by issuing an OpenDevice command. The VerifyMasterKey command is then issued to open the personal key 200 to master access. A Dir command is used in a loop to obtain and verify the status of the personal key 200. The comments are compared to the contents of a factory-fresh key, and one of several states is determined. If the key is factory fresh, the personal key is initialized. A VIEWDOC directory and file set is then created. An employee database can then be accessed and used to determine the type and extent of the access that is to be granted to each employee. Depending on the security clearance of each employee, one of several types of directory and file sets can be created. The global create and delete access types are then set to the master key using the SetAccessSettings command. The DOCFilename database is then loaded in the personal key 200, and the CreateDir and CreateFile APIs 260 are used as required to create and allocate directories and files. The SelectFile, WriteFile, and CloseFile API commands are used to load the files and the secret. Depending on whether access is to be limited to a particular number of occasions, the DATA or CTR file types are used.

The BUILDOC program is used to accept new documents into the secure access library. Using information from the personal key 200, encryption keys are generated that are used by a document encryption engine in the personal key 200.

The BUILDOC program is a stand-alone application that runs on trusted systems within the secure walls of the organization. It requires validation of the master key. It uses the personal key 200 to create an encryption key for each document file name.

First, the HashToken API 260 with the XOR option is used to hash together the DOCFilename, block number (computed by the BUILDOC program as it reads and encrypts the document), DOCSecret. The block number is calculated by the BUILDOC program as it reads and encrypts the document. The resulting MD5-XOR digest is used as the encryption key that is used by the encryption engine in the BUILDOC application. Then, the CreateFile, SelectFile, WriteFile, and CloseFile APIs 260 along with the HashToken in XOR mode are used on each document that is to be added to the secure document library.

The VIEWDOC program is a web browser 262 plug-in application allows the user to open, decrypt, and view the document based on his/her personal key 200 based document access codes. If desired, the view counters for some types of documents can also be decremented in the VIEWDOC program. The VIEWDOC program does not require file saving or forwarding, screen scraping, and printing.

The VIEWDOC program validates the user and uploads and decrypts the documents. It uses the VerifyPIN command API 260 to authenticate the user. The user can then view the documents listed in the personal key 200 directory as long as the personal key 200 remains communicatively coupled to the USB port 130.

A message facility, such as the message facility used in the WINDOWS operating system (WM_DEVICECHANGE) can be used to determine if the key has been removed. The Dir, SelectFile, ReadFile, and CloseFile command APIs 260 are used to determine which documents can be read. The HashToken with the XOR mode API 260 along with DOCSecret, DOCFilename, and the document block numbers are used to create the decryption key on a per block basis. When the DOCfilename is of file type CTR, the CTR is decremented using the Decrement command API 260. In one embodiment, to reduce complexity, the CTR field is not hashed, but merely managed by VIEWDOC.

The LIBDOC program provides an administrative function that is a subset of the SETKEY function. It allows a secure document librarian to grant access to documents based upon information stored in the personal key 200. The net effect is that the trusted librarian can update the personal key 200 based list of documents that can be viewed.

The LIBDOC program updates the list of DOCFilenames on a per-personal key 200 basis. After verifying the master key with VerifyMasterKey command API 260 and looking the user name up in the employee data base, the current set of DOCFilenames are updated using the SelectFile, WriteFile, and CloseFile command APIs 260.

Using the foregoing, employees worldwide can carry a personal key 200 loaded with their local database of file names. Individual departments do not have to rely on MIS procedures to restrict who has access to documents. The personal keys 200 of department members can be updated using the LIBDOC program as required. Documents can be decrypted and viewed by the employees only if the personal key 200 secret is correct. The personal secret remains secure because it is never revealed outside of the personal key 200. A simple form of metering can also be used to reduce the number of copies of documents that can be viewed.

Figure 6:
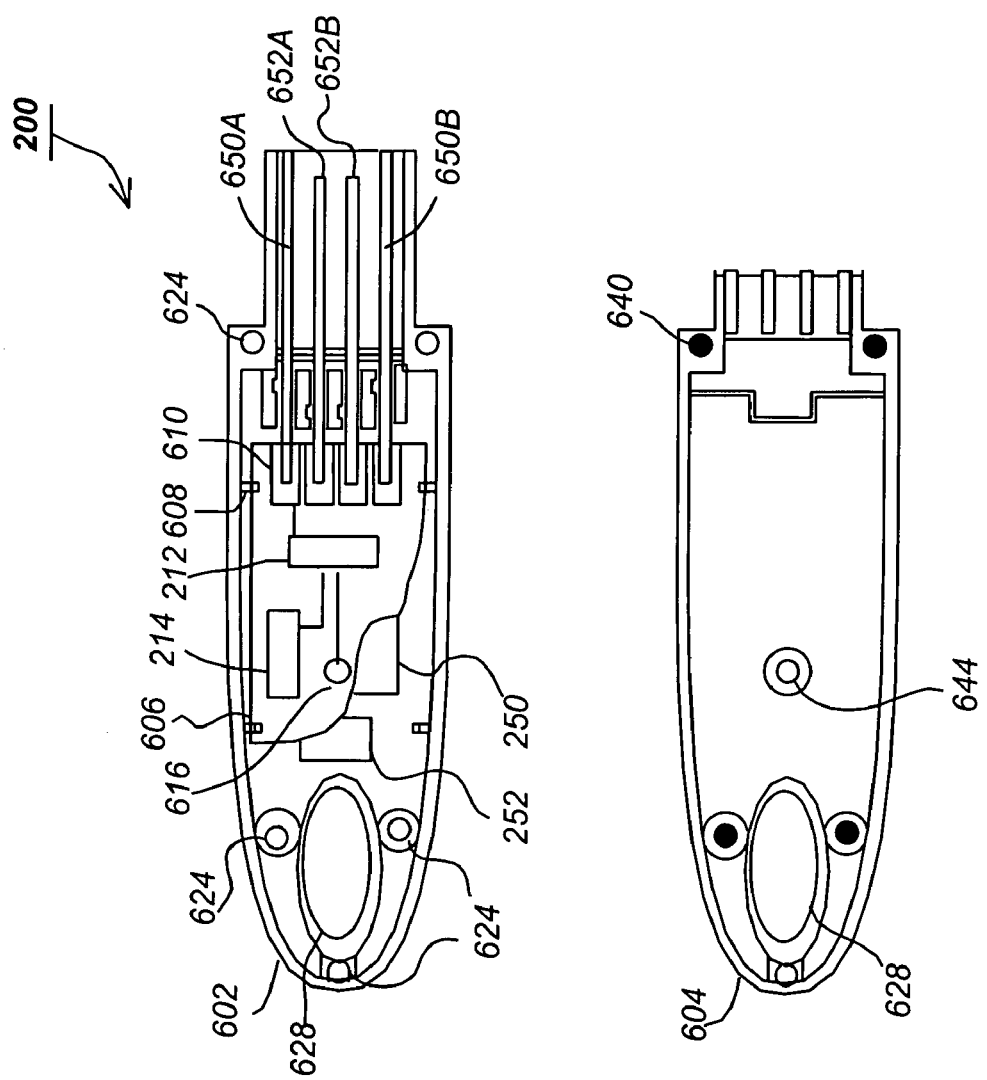
FIG. 6 is a diagram presenting an illustration of one embodiment of the personal key, showing the USB connector pin configuration.

FIG. 6 is a diagram presenting an illustration of one embodiment of the personal key 200. The personal key 200 comprises a first housing member 602 and a second housing member 604. The first housing member 602 is sized and shaped so as to accept a circuit board 606 therein.

The first housing member 602 comprises a plurality of bosses 624, which, when inserted into each respective hole 640 in the second housing member 604, secures the first housing member 602 to the second housing member 604. The first housing member 602 and the second housing member 604 also each comprise an aperture 628, which allows the personal key 200 to be affixed to a key chain.

The circuit board 606 is held in position by a plurality of circuit board supports 608. The circuit board 606 comprises a substantially flat circuit connection surface 610 on the periphery of the circuit board 606 for communicative coupling with the host processing device or computer 102 via conductive pins. Circuit connection surface 610 allows communication with a processor 212 mounted on the circuit board 606. The processor 212 comprises memory and instructions for performing the operations required to implement the functionality of the personal key 200 as disclosed herein. The processor is communicatively coupled with a memory 214 on the circuit board to store and retrieve data as required by processor 212 instructions. In the illustrated embodiment, the circuit board 606 also comprises an output device such as a light emitting device 616, e.g. light emitting diode (LED), which provides the user of the personal key 200 a visual indication of the operations being performed by the personal key 200. This is accomplished, for example, by emitting light according to a signal passing from the host computer 102 to the personal key 200. The light emitting device could also comprise a liquid crystal display (LCD) or other device providing a visual indication of the functions being performed in the personal key or data passing to or from the personal key 200.

The energy from the light emitting device 616 is presented to the user in one of two ways. In the embodiment illustrated in FIG. 6, the light emitting device 616 is disposed through a light emitting device orifice 644 in the second housing member 604. In this design, the personal key 200 can be sealed with the addition of a small amount of epoxy or other suitable material placed in the light emitting device orifice 644 after assembly.

In another embodiment, the light emitting device 616 does not extend beyond the interior of the housing 602, 604, and remains internal to the personal key 200. In this embodiment, at least a portion of the first housing 602 or the second housing 604 is at least partially translucent to the energy being emitted by the light emitting device 616 at the bandwidths of interest. For example, if the light emitting device 616 were a simple LED, the second housing 604 can be selected of a material that is translucent at visual wavelengths. One advantage of the foregoing embodiment is that the LED can be placed where it does not allow electromagnetic discharges and other undesirable energy to the circuit board 606 or any of the components disposed thereon. This is because no part of the LED, even the surface, is in contact with the user's hand at any time.

While the foregoing has been described with a single light emitting device 616, the present invention can also advantageously embody two or more light emitting devices, or devices emitting energy in other wavelengths. For example, the foregoing can be implemented with a three color LED (red, yellow and green), or three one-color LEDs to transfer personal key 200 information to the user.

In addition to or as an alternative to the foregoing, information regarding the operation of the personal key 200 is provided by an aural transducer such as a miniaturized loudspeaker or piezoelectric transducer. Such aural information would be particularly beneficial to users with limited or no vision. For example, the aural transducer can be used to indicate that the personal key 200 has been inserted properly into the host computer I/O port 130.

An aural transducer may also be used to provide alert information to the user. This is particularly useful in situations where the user is not expecting any input or information from the key. For example, if the personal key 200 or related device is engaged in lengthy computations, the aural transducer can indicate when the process is complete. Also, the aural transducer can indicate when there has been an internal fault, when there has been an attempt to compromise the security of the key with infected or otherwise harmful software instructions, or to prompt the user to take an action such as providing an input to the key 200.

Further, it is envisioned that as the use of personal keys 200 will become widespread, it will be beneficial to incorporate the functions of other devices within the personal key. For example, a device such as a paging transceiver can be incorporated into the personal key to allow the user to be summoned or contacted remotely. Or, the personal key 200 may be used to store programs and instructions such as the user's calendar. In this application, the personal key 200 can be used to remind the user of events on the calendar, especially in conjunction with the LCD display discussed above. The aural transducer can be operated at a wide variety of frequencies, including minimally audible vibrational frequencies. This design is particularly beneficial, since the personal key is small enough to be placed on the user's key ring, where it will be in a pocket or purse for lengthy periods of time where it cannot be seen or easily heard. The I/O port 206 of the token 200 comprises four pins that provide power, ground, and data signals between the token 200 and the devices attached thereto. Power/ground pins 650A and 650B are of greater length than the signal pins 652A and 652B. This permits the power and ground connectivity to be established before the signal connectivity.

Figure 7:
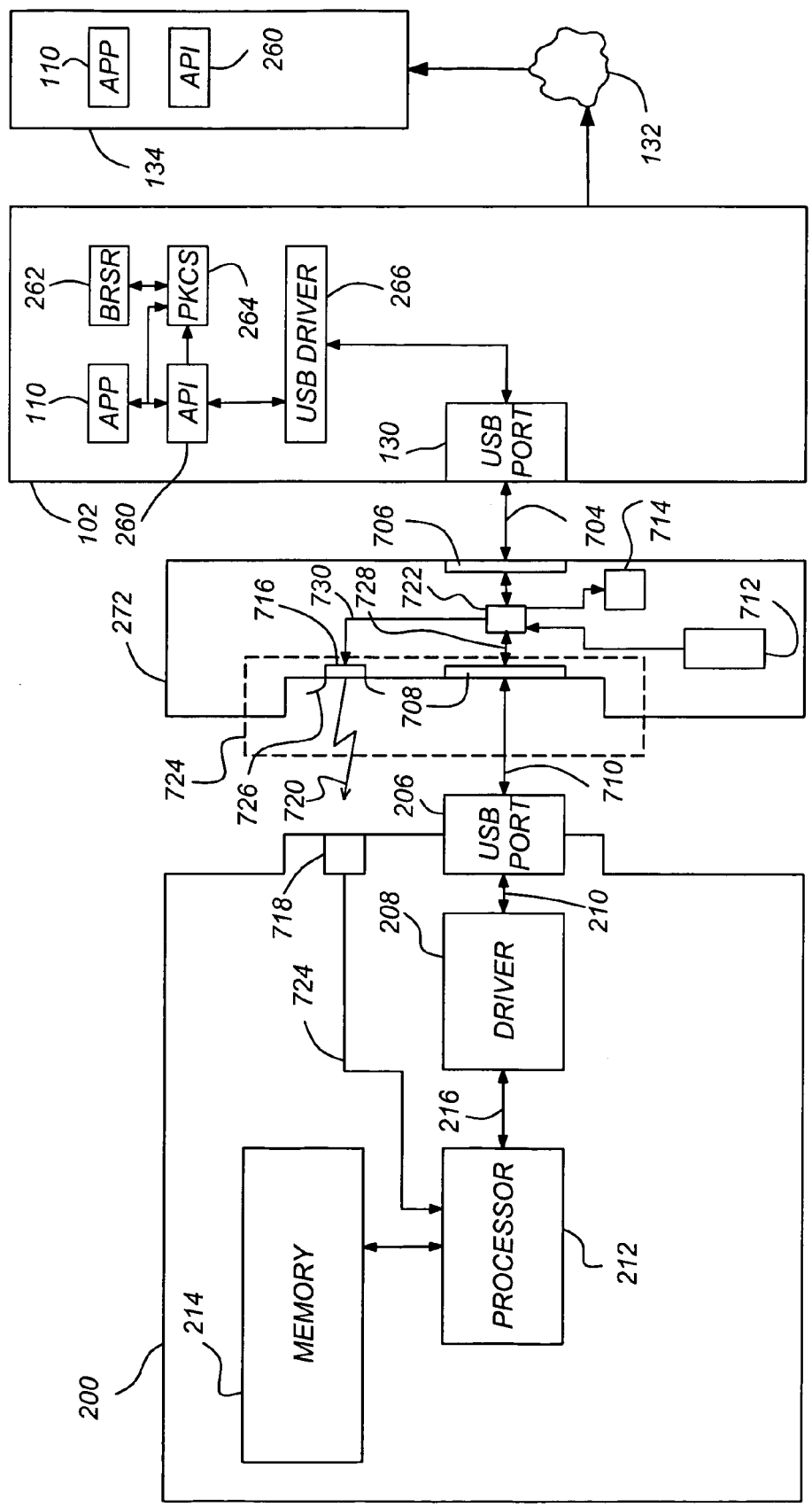
FIG. 7 is a block diagram of one embodiment of the present invention in which the user's PIN is entered into a data entry device and communicated to the token via a secure communications path.

FIG. 7 is a block diagram of one embodiment of the present invention in which the user's PIN is entered into a data entry device. In this embodiment, a PIN entry device 272 is communicatively coupled between the host processing device or computer 102 and the token or personal key 200. The I/O port 130 of the host computer is communicatively coupled to the first I/O port of the data entry device 272 via a first communication path 704, and a second I/O port 708 of the data entry device 272 is communicatively coupled via path 710 to the I/O port 206 of the personal key 200. The data entry device 272 generally comprises a keypad 712 or other input device for accepting a user-entered PIN or other data, and may comprise an output device 714 to provide a prompt or other information, including information assisting the user in determining when and/or how to enter information into the data entry device 272.

Information maybe communicated by the second communication path 710 using I/O ports 206 and 708. Once the user's PIN has been entered into the key, communication encryption techniques can be used to prevent the compromise of data transferred along the second communication path. However, it is not desirable to allow the user's PIN to be transmitted along the second communication path 710 plaintext, and before the user is identified, secure encrypted communications are difficult to implement.

First communication path 704 can be secured by preventing physical access to the communication path, by encrypting messages, sent along the path 704, or by use of both techniques. Since the data entry device 272 will typically be paired and remain with the host computer 102, a variety of communication encryption techniques can be used, including public or private key encryption. However, since the data entry device 272 may interface with a number of different tokens 200 from different users, private key encryption techniques are inappropriate to secure data transfer between the token 200 and the data entry device 727 along the second communication path 710. It may be possible to at least partially secure such communications by physically denying access to the communication path 710, but in many instances, it is impossible to assure the integrity of the path.

To ameliorate this problem, the data entry device 272 includes a token interface 724 that provides a secure third communication path 720. The third communication path 720 is distinct from the second communication path 710 (and the first communication path 704), and is hence not susceptible to sniffer software operating somewhere on a USB hub or anywhere in a place where it can monitor communication paths 710 and 704. The third communication path 720 can be used to perform all sensitive communications between the token 200 and the data entry device 272 (such as the transmission of the user's PID), or the third communication path can be used in conjunction with the second communication path 710 to perform the transfer of such information. For example, the sensitive information may be separated into two portions, both of which are required to reassemble the sensitive information after transmission. One such portion of the sensitive information may be sent by the second communication path 710 and other portion using the third, secure communication path 720. This technique can enhance security by requiring a sniffer to be capable of monitoring both the second communication path 710 and the third communication path 720 (which may involve a different transmission technique, e.g. IR) at the same time. This technique can also be used to expedite the transmission of large amounts of data between the token 200 and the data entry device 272, by using two communication paths simultaneously, or by dedicating high data rate communications to one of the communication paths 710, 720 and lower data rate communications to the other path. The third data path 720 can also be used to transmit a public or private key between the data entry device 272 and the token 200, and such key can be used to encrypt the transmission of the sensitive information (e.g. the user's PIN) from the data entry device 272 to the token 200.

In one embodiment, the second communication path 710 and the third communication path 720 use different transmission/reception modalities. For example, the second communication path 710 is a wired communication path, the third communication path 720 can be a non-wired communication path involving the transmission and reception of electromagnetic energy. In the illustrated embodiment, the third communication path 720 is implemented by a token interface emitter or transmitter 716 and a token sensor 718. Although the emitter/sensor pair can transmit/receive data at different wavelengths, in the preferred embodiment, visible or infrared (IR) wavelengths are used.

The token 200 is inserted into (and thus physically coupled with) the token interface 724, thus placing the token I/O port 710 in a physical configuration wherein communication with the data entry device I/O port 708 (if desired) can be accomplished. At the same time, physical coupling of the token 200 with the token interface 724 communicatively couples the token sensor 718 with the token interface emitter 716 (e.g. it places the token sensor 718 in a physical configuration wherein it can receive transmissions from the token interface emitter 716). Also, when the token 200 is physically coupled with the interface 724, the shield 726 substantially confines reception of the signal provided by the emitter 716 to the sensor 718. In one embodiment, this is accomplished by surrounding the emitter 716 with a shield 726 that is substantially opaque to the energy in the wavelengths of the signal transmitted from the emitter 716. The shield 726 need not be completely opaque to such energy, just sufficiently opaque to prevent emissions that are of a magnitude sufficient to permit their reception by sensors which are not physically proximate the emitter 716. In one embodiment, this is accomplished by substantially circumscribing the emitter 716 with an opaque shield 726. In the embodiment illustrated in FIG. 7, a shield 726 is provided to prevent unauthorized reception of the signal from the emitter 716. However, the interface 724 may also be designed to prevent unauthorized reception without the use of a shield 726. Further, the shield 726 may also be integrated with the data entry device 272. That is, the shield 726 can be formed partially or completely from the external surface of the interface 272 itself. Shielding may also be provided by structures disposed on or integrated with the token 200 in addition to or in the alternative to the shield structures used on the data entry device 272, if desired.

As a precaution to assure that energy is not emitted from the emitter 716 until the sensor 718 is proximately disposed and/or the shield 726 prevents reception of the energy by an unauthorized sensor, the interface 724 can be designed so that the emitter 716 does not receive power until the token 200 is inserted far enough into the interface 724 to assure that the shield 726 substantially confines reception of the signal to the sensor 718.

In one embodiment, the token I/O port 710 and the data entry device I/O port 708 are USB-compliant interfaces that include a plurality of signal pins and a power pin that is recessed from the signal pins. As described by the "USB Serial Bus Specification, Revision 1.1" published Sep. 23, 1998, by the Compaq, Intel, Microsoft, and NEC Corporations (which reference is hereby incorporated by reference), the USB interface provides for the detection and sensing of new devices added to the USB network. This is accomplished by sensing characteristic signal changes in the signal and power pins (which are shorter than the signal pins and hence are engaged after the signal pins when the token 200 is plugged into the interface 724) in the USB interface. In this case, the data entry device 272 can deactivate (e.g. by withdrawing power from) the emitter 716 until an indication is received that the token 200 is fully inserted into the interface 724. The dimensions of the interface 724, the token 200, the emitter 716, the sensor 718, the shield 726, the length of the pins in the data entry device I/O interface 708, and other elements can be selected so that the data entry device 272 does not detect the presence of the inserted token 200 (and hence will not provide power to the emitter 716) until the token 200 is inserted far enough to ensure that the shield 726 is disposed so as to prevent the unauthorized reception of the signal.

Figure 8:
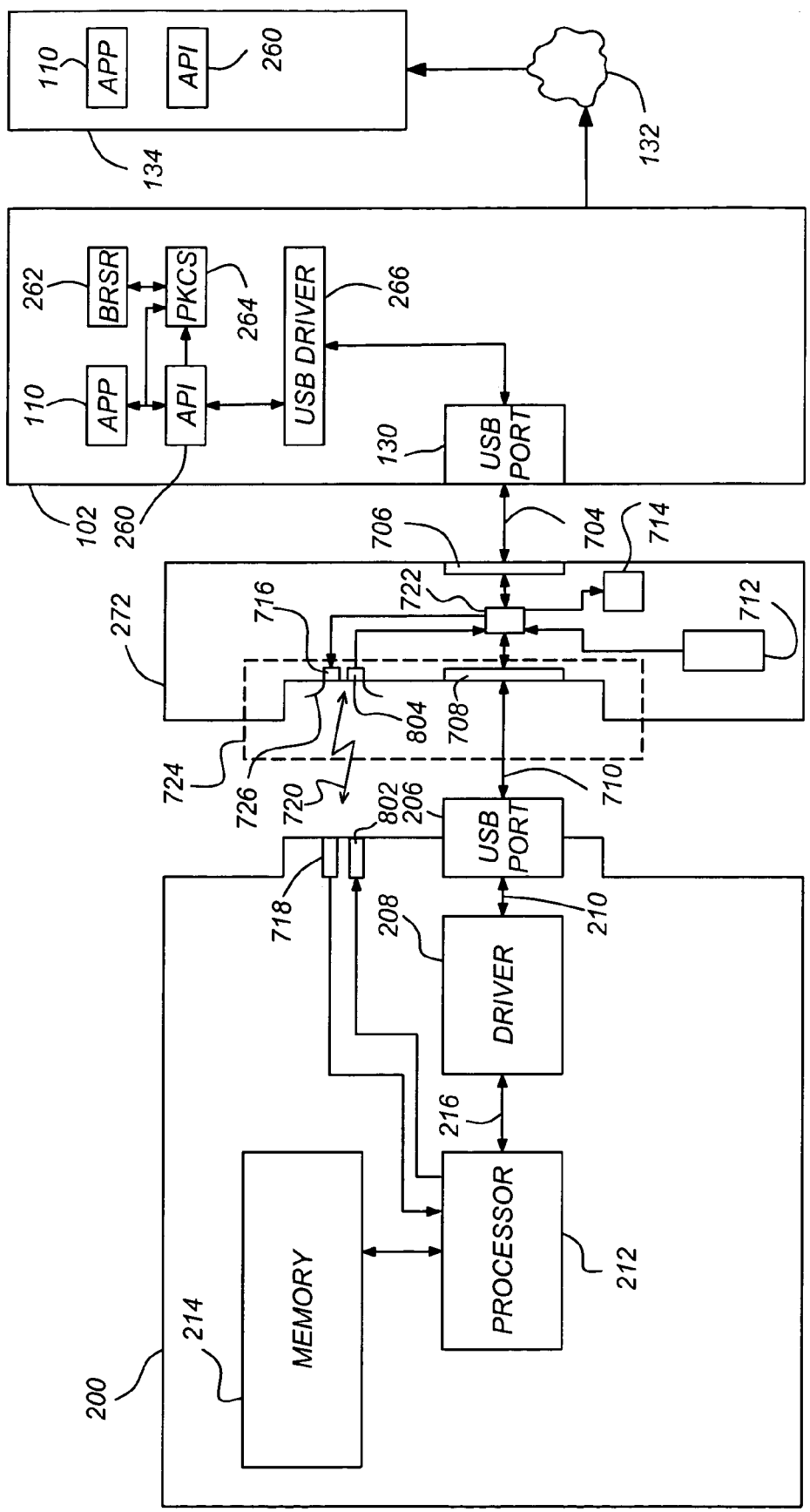
FIG. 8 is a block diagram of an embodiment of the present invention in which the token interface and token are configured for two-way communications via the secure communications path.

FIG. 8 is a diagram presenting a second embodiment of the present invention. In this embodiment, the data entry device 272 further comprises a token interface sensor 804 communicatively coupled to processor 722, and the token 200 further comprises a token emitter 802 communicatively coupled to the processor 212 in the token. This embodiment permits two-way communications between the token 200 and the data entry device 272, thus permitting two-way secure communications along a communication path that is separate from the second communication path 710.

Among other things, this secure, two-way communication path 720 can be used to control when and whether the sensors and emitters in the data entry device 272 and the token 200 are permitted to transmit and receive data. For example, to assure that the signal from either of the emitters 716, 802 is not compromised, the sensors 718, 804 and the transmitters 716, 802 can be used to determine the proximity of the sensors/emitters to one another before data is actually transmitted over the communication link 720.

For example, the emitter 716 can transmit a low intensity signal (that does not include sensitive information). The signal itself can be of such low intensity that it can only be received by sensors that are in the immediate vicinity of the emitter 716. As the token 200 is inserted into the interface 724, the sensor 718 in the token 200 receives the signal transmitted by the emitter 716. After suitable processing by the processor 212, the token emitter 802 can then emit a signal indicating that the token 200 is sufficiently close to the interface 724 so that the signal will not be intercepted, and the processor 722 can now transmit the user's PIN over the secure communications link 720 (or, using the interface 714, instruct the user to enter the PIN at the input device 712).

Further, the emitters/sensors in the token 200 and the data entry device 272 can be used to control the intensity of the emitted signal in a closed loop fashion (through the token 200 and the data entry device 272 processors 212, 722 to assure that the emitted signal is just strong enough to be received by the intended device and not intercepted elsewhere. In this embodiment, the signal transmitted from the token 200 includes information describing the intensity of the signal received by the token 200 from the data entry device 272.

Figure 9:
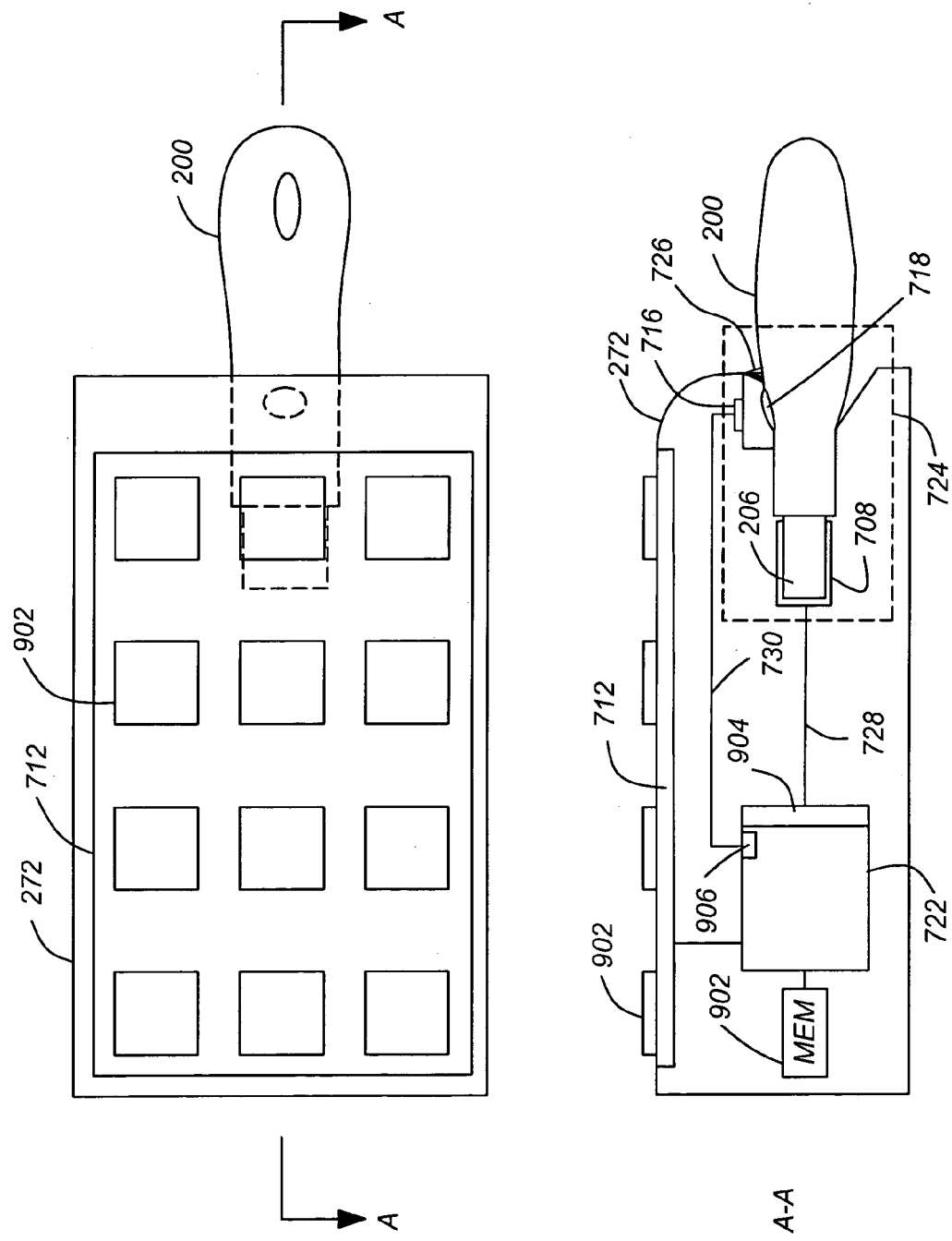
FIG. 9 is a diagram showing an exemplary embodiment of the data entry device and an interfacing token.

FIG. 9 is a diagram presenting an illustrative example of an implementation of the present invention. In the illustrated embodiment, the data entry device 272 includes a keypad 712 having a plurality of buttons 902 for entering alphanumeric data. The keypad 712 is communicatively coupled to one or more processors 722. The processor 722 is communicatively coupled to I/O port 708 via communication path 728. In one embodiment, driver 904, whether implemented in the processor 722 or separate from the processor 722, provides an interface for assuring communications received from and transmitted to the token 200 comply with the USB protocol. Similarly, if required, a second communication path driver 906 provides an interface between the processor 722 and the emitter 716 to assure compliance with any protocols for communications via the sensor 718 and the emitter 716. Communication path 730 provides a second, distinct, and independent communication path that is used for the transmission of some or all of the user's PIN and other sensitive data.

To use the token 200, the user places the token in the interface 724. By placing the token 200 in the interface 724, the token interface emitter 716 is placed in adequate proximity to the token sensor 718, thereby allowing communication of data (e.g. a PIN entered in the data entry device 272) to the token 718 via a communication path that is separate and distinct from the I/O ports 706 and 708. In the embodiment illustrated in FIG. 9, the shield 726 includes a plurality of brush elements extending from the data entry device 272 and contacting the token 200 when the token 200 is inserted into the interface. Collectively, the brush elements 726 are substantially opaque to the energy emitted by the emitter 716, and therefore, confine reception of the signal from the emitter to the token's sensor 718 when it is inserted into the interface 724.

Figure 10:
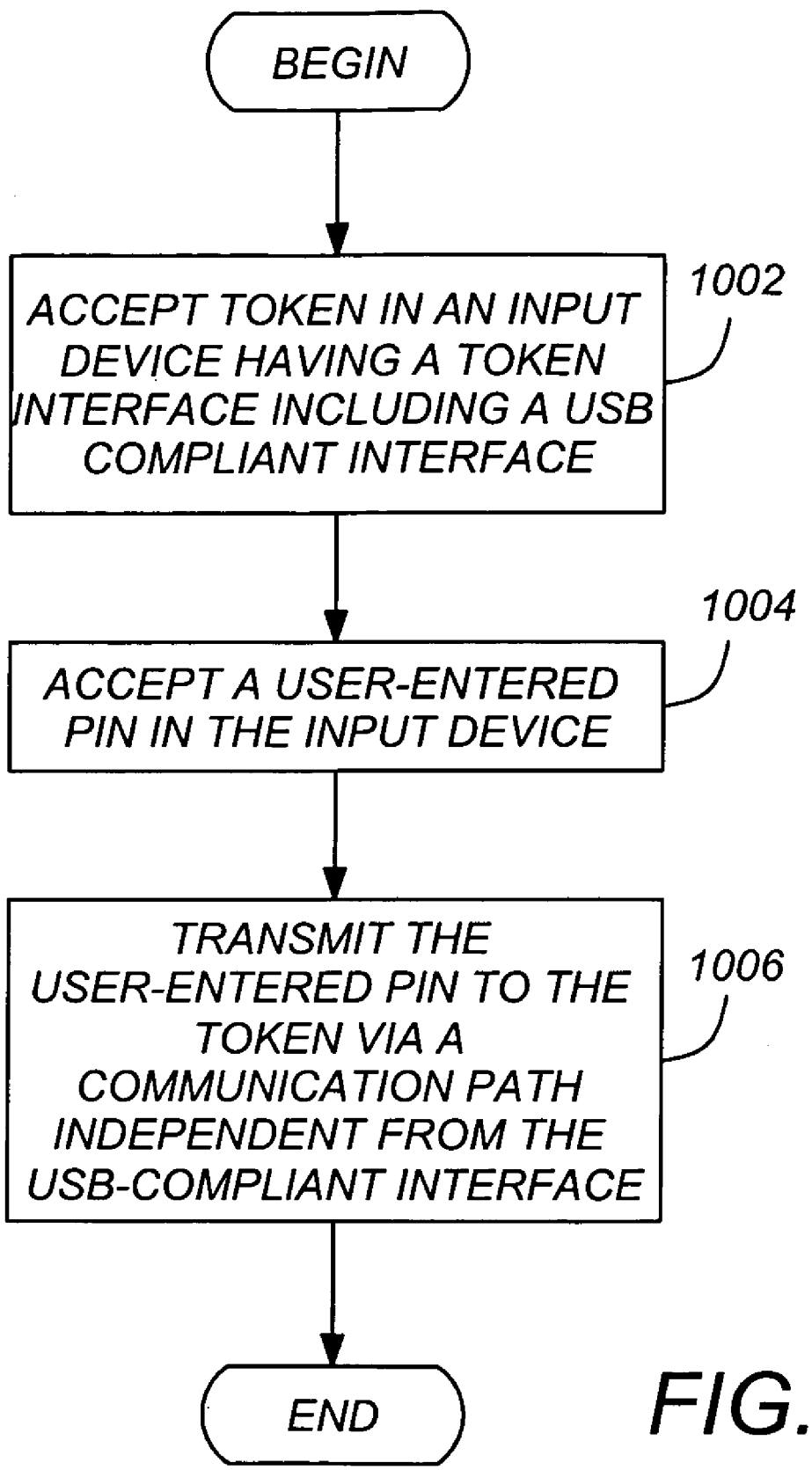
FIG. 10 is a diagram showing exemplary method steps that can be used to practice one embodiment of the present invention.

FIG. 10 is a flow chart presenting illustrative method steps used to practice one embodiment of the present invention. A token 200 is accepted in an input device 272 having a token interface 724, as shown in block 1002. The token interface 724 can include, for example, a USB-compliant interface and an emitter 716.

The host computer 102 transmits a message, which is received by the data entry device 272. The message may be addressed to the data entry device 272, or can be addressed directly to the token 200, and intercepted by the data entry device 272. Typically, the message comprises a VerifyPIN2 command, but the message may be any of the messages described in Table 6. The VerifyPIN2 command can be sent to verify the identity of the holder of the token 200 before a transaction takes place, or can be part of the authorization request, wherein direct user interaction is required to authorize the use of identified secret values stored in the token. Alternatively, the VerifyPIN2 command can be issued when the token 200 is inserted into the data entry device or any USB port in a USB network.

The data entry device 272 then accepts user-input data such as a PIN, as shown in block 1004. In one embodiment of the present invention, the data entry device 272 includes an output device to prompt the user to enter the data. The output device may include, for example, an LCD, LED, or other display, or an aural device. The data (e.g. the user entered PIN) is accepted in the data entry device 272, as shown in block 1004. A second message is generated comprising at least a portion of the user-input data. The second message is transmitted to the token 200 via a communication path independent from the USB-compliant interface. This is illustrated in block 1006. In one embodiment, the second message is a VerifyPIN command using the user-entered PIN as the argument, and the VerifyPIN command is transmitted via communication path 720.

The VerifyPIN command message can be transmitted to the token 200 in one message or a plurality of messages as desired. The token 200 receives the message, validates the user-entered PIN, and provides a response indicating the validity of the PIN. This message, however, does not include the PIN itself, at least not in unencrypted form. A response, indicating whether the PIN is valid is then transmitted to the host computer 102 via the data entry device 272. In an alternative embodiment, the token 200 may be communicatively coupled to the data entry device 272 so that the second message is transmitted directly to the token 200. Typically, this message is transmitted via the second communication path 710, but in embodiments wherein the third communication path 720 allows transmission of information from the token 200 to the data entry device, 272 (e.g. the embodiment depicted in FIG. 8), the message can be transmitted by the third communication path 720 as well.

Figure 11:
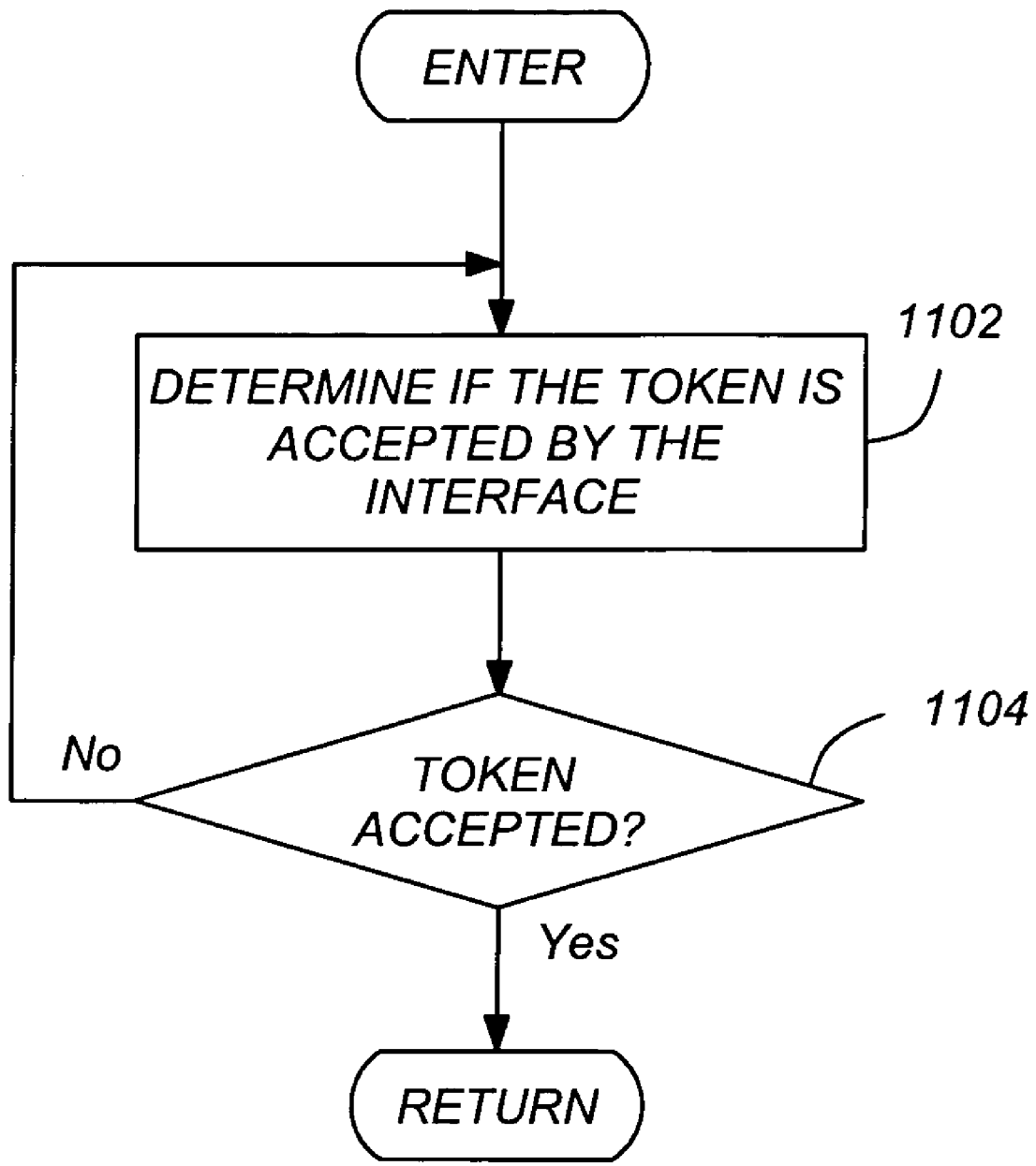
FIG. 11 is a diagram showing exemplary method steps that can be used to assure that the token is accepted by the data entry device before sensitive information is transmitted to the token.

FIG. 11 is a flow chart presenting illustrative method steps for an embodiment of the present invention wherein information is not transmitted from the data entry device 272 to the token 200 until the token 200 is determined to have been accepted by the interface (thereby helping to ensure that the third communication path 720 is not compromised). A determination is made as to whether the token 200 is accepted by the interface 724. If so, the token is accepted 1104 and processing continues as shown in FIG. 10. If not, processing loops back to block 1102. In cases where the token 200 is not properly coupled with the data entry device 272, a message or prompt may be issued to inform the user that the token 200 must be properly coupled before the PIN is entered or before the PIN, after entry, is transmitted to the token 200. The determination as to whether the token 200 is properly connected to the interface 724 can be performed in a number of ways. In one embodiment, this is accomplished using USB protocol messages that indicate when a new USB-compliant device is attached. To assure further security, the data entry device 272 itself may include circuitry and/or processing apart from the USB-compliant protocol messages to determine when the token 200 is properly attached. This can be accomplished, for example, by examination of the power and/or ground pins of the USB interface. This can also be accomplished by the transmission of a signal indicating that the token is connected from the token 200 to the data entry device.

Figure 12:
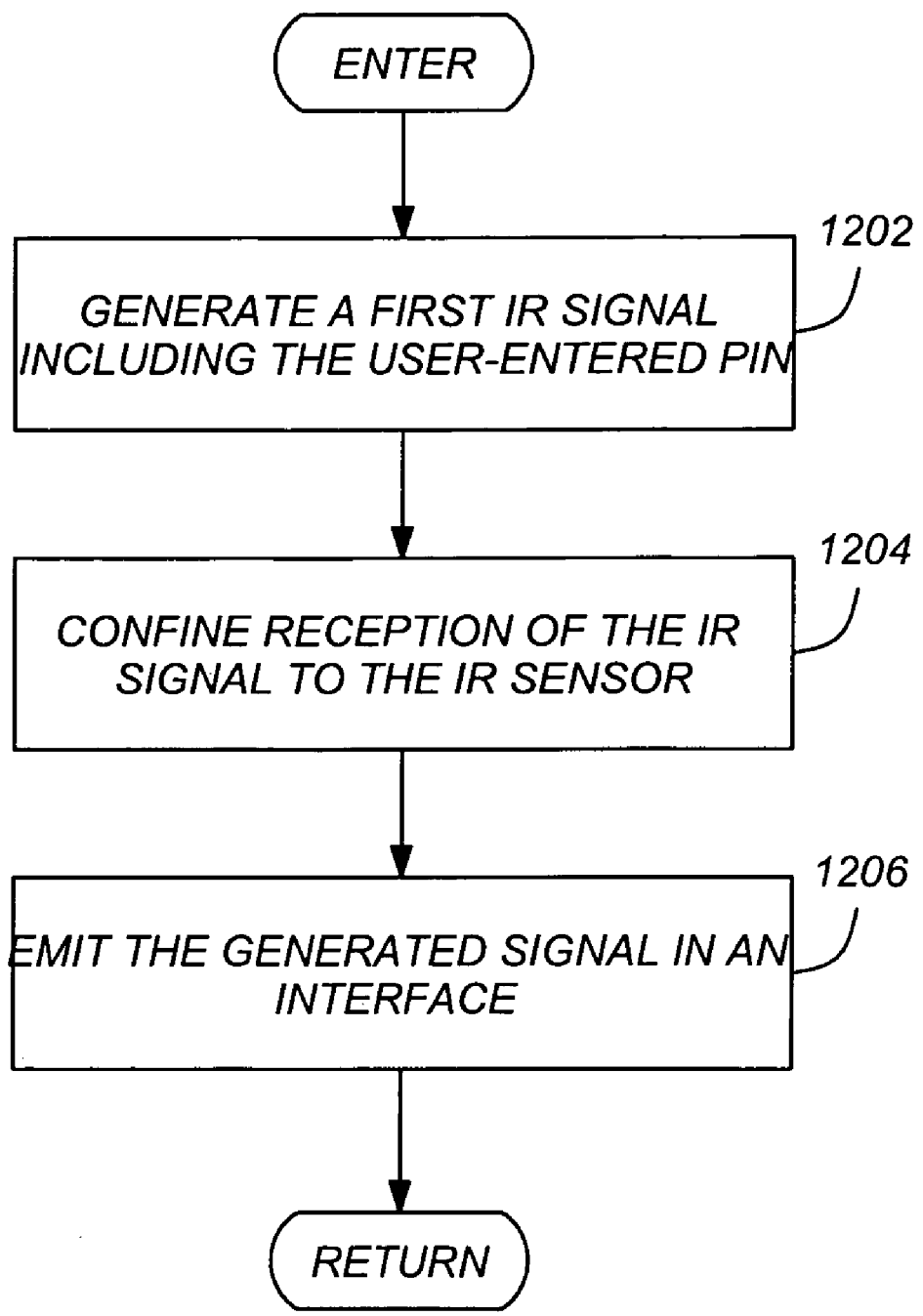
FIG. 12 is a diagram showing exemplary method steps that can be used to transmit the user-entered PIN from the data entry device to the token.

FIG. 12 is a block diagram presenting illustrative process steps that can be used to transmit the user-entered PIN to the token 200 via the third communication path 720. A first infrared (IR) signal that includes information describing the user-entered PIN is generated, as shown in block 1202. Reception of the IR signal is confined to the IR sensor 718, as shown in block 1204. In one embodiment, this is accomplished by providing a shield opaque to the wavelengths of the emitted signal (in the illustrated embodiment, the signal is emitted at IR wavelengths, and the shield is substantially opaque to IR wavelengths). Then, as shown in block 1206, the generated signal is emitted in the interface.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of securing a token having a USB-compliant interface from unauthorized use, comprising the steps of:
   accepting the token in an input device having a token interface, the input device being communicatable with a host processing device and being different from a keyboard associated with the host processing device;
   accepting a user-entered personal identifier in the input device;
   transmitting the user-entered personal identifier to the token via a communication path distinct from the USB-compliant interface by generating a first signal having information including the user-entered personal identifier, and emitting the generated signal in the token interface for reception by a token sensor; and
   physically shielding the signal in a manner, with respect to the wavelength of the signal, to prevent emissions that are of a magnitude sufficient to permit their reception by sensors which are not physically proximate the emitter and to confine reception of the signal to the sensor.

2. The method of claim 1, further comprising the step of receiving the generated first signal in a token sensor.

3. The method of claim 1, wherein:
   the method further comprises the step of determining if the token is accepted in the device; and
   the user-entered personal identifier is transmitted to the token via a communication path independent from the USB-compliant interface only if the token is determined to be accepted by the input device.

4. The method of claim 3, wherein the step of determining if the token is accepted in the input device comprises the step of sensing a connect signal.

5. The method of claim 3, wherein the step of determining if the token has been accepted by the input device comprises the step of: receiving a second signal produced by a token emitter when the token is accepted by the token interface.

6. The method of claim 3, wherein the step of determining if the token has been accepted by the input device comprises the step of:
   receiving a second signal produced by a token emitter after the token sensor receives a third signal in the token interface.

7. The method of claim 1, further comprising the steps of:
   receiving a second signal produced by a token emitter, the second signal including information describing the intensity of the first signal; and
   controlling the intensity of the first signal according to the information describing the intensity of the first signal received from the second signal.

8. The method of claim 1, further comprising the steps of:
   disabling transmission of the user-entered personal identifier until detection of the acceptance of the token to the USB port.

9. An input device for securing a token from an unauthorized user:
   a user interface for accepting entry of a personal identifier from a user, the user interface being communicatable with a host processing device and being different from a keyboard associated with the host processing device;
   a processor, communicatively coupled to the user interface;

a token interface, including:
a token interface emitter, for producing a signal having information including the personal identifier, the token interface emitter communicatively coupled to the processor and further communicatively coupled to a token sensor when the token is physically coupled with the token interface, the signal produced by the token interface emitter being sent to and received by the token; and
a physical shield, shielding the signal in a manner, with respect to the wavelength of the signal to prevent emissions that are of a magnitude sufficient to permit their reception by sensors which are not physically proximate the emitter, for substantially confining reception of the signal to the token sensor.

10. The input device of claim 1, wherein the token interface emitter is communicatively decoupled from the token sensor when the token is not physically coupled with the token interface.

11. The input device of claim 1, wherein the token interface includes a USB port.

12. The input device of claim 1, wherein the shield substantially circumscribes the token interface emitter.

13. The input device of claim 1, wherein the token interface further comprises:
a token interface sensor configured to receive the signal produced by a token emitter when the token is physically coupled with the token interface.

14. The input device of claim 13, wherein the token emitter emits a second signal including information describing the intensity of the signal.

15. The input device of claim 14, wherein the processor controls the intensity of the first signal according to the information describing intensity of the first signal received from the second signal.

* * * * *